United States Patent [19]
Ault et al.

[11] Patent Number: 6,065,019
[45] Date of Patent: May 16, 2000

[54] METHOD AND APPARATUS FOR ALLOCATING AND FREEING STORAGE UTILIZING MULTIPLE TIERS OF STORAGE ORGANIZATION

[75] Inventors: Donald F. Ault, Hyde Park; John F. Fischer; Eric T. Miller, both of Wappingers Falls, all of N.Y.

[73] Assignee: International Business Machines Corporation, Armonk, N.Y.

[21] Appl. No.: 08/954,711

[22] Filed: Oct. 20, 1997

[51] Int. Cl.[7] ................................................ G06F 12/02
[52] U.S. Cl. ............................... 707/206; 711/171
[58] Field of Search .................... 707/205, 206; 711/170, 171, 173

[56] References Cited

U.S. PATENT DOCUMENTS

| | | | |
|---|---|---|---|
| 5,063,500 | 11/1991 | Shorter | 395/200 |
| 5,088,036 | 2/1992 | Ellis et al. | 395/425 |
| 5,247,634 | 9/1993 | Cline et al. | 395/425 |
| 5,325,526 | 6/1994 | Cameron et al. | 395/650 |
| 5,345,588 | 9/1994 | Greenwood et al. | 395/650 |
| 5,367,637 | 11/1994 | Wei | 395/250 |
| 5,371,885 | 12/1994 | Letwin | 395/600 |
| 5,404,521 | 4/1995 | Murray | 395/650 |
| 5,430,871 | 7/1995 | Jamoussi et al. | 395/600 |
| 5,440,692 | 8/1995 | Janicek | 395/700 |
| 5,485,626 | 1/1996 | Lawlor et al. | 395/650 |
| 5,561,785 | 10/1996 | Blandy et al. | 711/170 |
| 5,561,786 | 10/1996 | Morse | 395/497 |
| 5,577,243 | 11/1996 | Sherwood et al. | 707/7 |
| 5,608,893 | 3/1997 | Slingwine et al. | 395/468 |
| 5,623,654 | 4/1997 | Peterman | 707/206 |
| 5,625,819 | 4/1997 | Hoffer, Jr. | 395/618 |
| 5,652,883 | 7/1997 | Adcock | 707/206 |
| 5,809,554 | 9/1998 | Benayon et al. | 711/171 |

OTHER PUBLICATIONS

IBM Technical Disclosure Bulletin, vol. 39, No. 8, 8/96, "Transparent Pooling . . . Heaps", by Benayon, pp. 219–220.
Proceedings of the Ninth ACM Symposium on Operating Systems Principles, Oct. 13, 1983—"Fast Fits New Methods . . . Systems) " by Stephenson pp. 30–32.
Int.Journal of Comp. and Inf. Sciences, vol.9, No. 1,1980, "A Method for . . . the Root" by Stephenson, pp. 15–29.

*Primary Examiner*—Do Hyun Yoo
*Assistant Examiner*—Gary J. Portka
*Attorney, Agent, or Firm*—William A. Kinnaman, Jr.

[57] ABSTRACT

A method and system for allocating and freeing storage are provided. The method can be built on top of any existing storage management algorithm. The method is described as being built upon the heap storage algorithm most often associated with the C programming environment. The method operates by breaking all storage requests into a fixed number of pools. Each pool is then managed by three tiers of management. The first tier is a so-called quick pool consisting of storage blocks which have already been used and freed and are managed on a LIFO queue. The second tier is made up of cell pool extents that are carved from the heap and then further subdivided into blocks of the appropriate size for each pool. The third tier is made up of the existing heap management algorithms or any other storage management algorithm. The method relies on atomic hardware instructions for removing blocks from the quick pools and cell extents. The lack of blocking serialization allows this method to provide a high performing storage manager, even in multithreaded applications with a high degree of concurrency in malloc( ) and free( ) requests from the threads. Any storage request of a size beyond the largest pool size is satisfied by use of the old malloc( ) interface.

30 Claims, 11 Drawing Sheets

METHOD AND APPARATUS FOR ALLOCATING AND FREEING STORAGE UTILIZING MULTIPLE TIERS OF STORAGE ORGANIZATION

NOTICE REGARDING COPYRIGHTED MATERIAL

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

This invention relates to a method and apparatus for allocating and freeing storage in an information handling system and, more particularly, to a method and apparatus lor allocating and freeing storage utilizing multiple tiers of storage organization.

2. Description of the Related Art

In the C programming language, applications use the function malloc( ) to allocate a piece of storage, the function free( ) to release the storage for subsequent reuse, and the function realloc( ) to change the size of a piece of storage. (The double parentheses are standard notation for C library calls.) These functions, which are sometimes referred to as heap management, are well known in the art and are described in any of a number of references on the C programming language and its extensions.

There is a generally accepted heap manager that is used on many UNIX® systems. This algorithm, known as the Stephenson algorithm after its inventor, obtains storage in the size requested and uses a binary tree to keep track of free elements. The algorithm works relatively well in a single-threaded process where there is only one caller in malloc( ) or free( ) at a given time. The problem occurs when running many threads in a single process. When these threads call malloc( ) and free( ), it is necessary for the heap manager to obtain serialization to control updates to the binary tree. This serialization causes contention in the algorithm. When running on a multiprocessor, this serialization causes the multiple threads to stack up on the heap latch and reduces the degree of concurrency that can be achieved. The suspend and resume which occur around the heap latch contention also contribute to significantly longer path length on malloc( ) and free( ) requests.

An object of the present invention is therefore to provide high-performance malloc( ), free( ) and realloc( ) functions which do not create contention in a multithreaded application.

SUMMARY OF THE INVENITON

The present invention contemplates, in an information handling system having a predetermined routine (e.g., malloc( )) for obtaining storage from a repository, a method and apparatus for obtaining storage for a requester while minimizing use of the predetermined routine and the contention that it may produce in a multithreaded environment. In accordance with the invention, one or more sets ("quick pools") of previously assigned storage blocks ("cells") that have been released by requesters is maintained, together with one or more sets ("cell pools") of unassigned cells that have been obtained from the repository using the predetermined routine but have not been assigned to a requester. Preferably, a plurality of quick pools and cell pools are maintained, the cells in each pool having a predetermined size.

An incoming storage request is completed using the predetermined routine if the size requested is larger than any cell size. If the size requested is within an existing cell size, then the request is completed from the appropriate-size quick pool if it can be completed from there. If the storage request cannot be completed from the quick pool but can be completed from the corresponding cell pool, it is completed from the cell pool. Only if the storage request cannot be completed from either the quick pool or the cell pool is it completed from the repository, either by using the predetermined routine to replenish the cell pool or by a directing the request to the predetermined routine if the cell pool cannot be replenished.

Preferably, incoming storage requests are completed from the quick pool or cell pool using atomic operations such as test-and-set hardware instructions, minimizing any contention in a multithreaded environment.

Each quick pool of previously assigned cells may be maintained as a linked list accessed in a LIFO fashion. Preferably both the quick pools and the cell pools are initially empty and are populated with cells (using the predetermined routine) only in response to a storage request corresponding to that cell size. Upon their release by the requesting routine, cell; are returned to the corresponding quick pool, regardless of whether the cells originated from the quick pool or from the corresponding cell pool.

To optimize storage, counts may be maintained of the number of blocks requested for each of a plurality of storage sizes, and optimum cell sizes for the pools determined based upon the counts.

In most existing heap management algorithms, an attempt is made to satisfy each storage request with a piece of storage exactly the size requested. This requires a fairly complex algorithm to keep track of all the different storage sizes. With the method provided by this invention, all storage requests are satisfied by providing a block of storage from one of a fixed number of pools. For example, lets say that one has 6 storage pools or size 16, 64, 256, 512, 1024 and 2048 byte cells in each pool. Any malloc( ) request for 1 to 16 bytes is satisfied by using a cell from pool 1. If a user requests 8 bytes, then they get a 16 byte cell to use and 8 bytes of space is wasted. If the user requests 1025 bytes, then a cell of size 2048 is provided and 1023 bytes are wasted. As can be seen, choosing the best cell size for the pools can have a significant effect on the amount of storage that is wasted. That is why a storage report is built into the method, so that the person running the application can determine the best cell sizes for each of the pools. Once optimal cell pool sizes are known for a specific application, these cell sizes can be provided as input or hard-coded into the application.

DESCRIPTION OF THE PREFERRED EMBODIMENT

Figure 10:
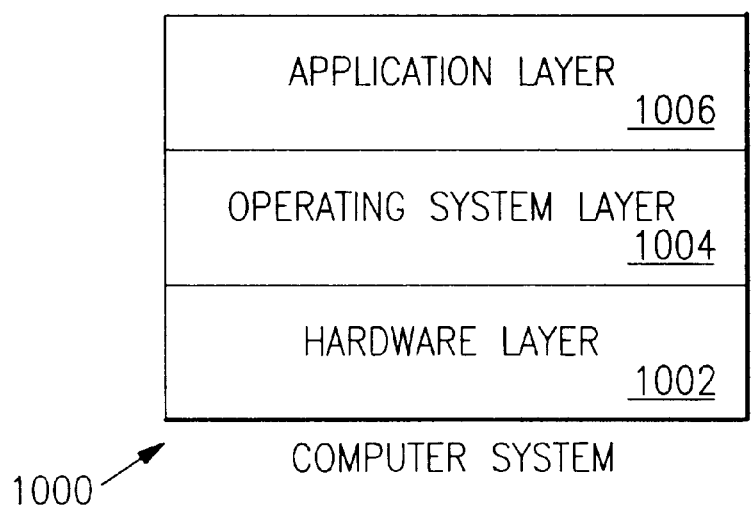
FIG. 10 shows the basic platform layers of a computer system in which the present invention may be used.

Referring to FIG. 10, the present invention is used in a computer system 1000 having a hardware layer 1002, an operating system (OS) layer 1004 and an application layer 1006. Hardware layer 1002 contains the basic hardware components of one or more physical machines, including one or more central processors (CPs), main storage and such peripheral input/output (I/O) devices as secondary storage, printers, operator consoles and the like. Since these hardware components function conventionally in the present invention, they are not separately shown. OS layer 1004 consists of system-level programs that manage the hardware resources and provide basic system services to user-level programs. Finally, application layer 1006 comprises one or more user-level programs that perform such real-world tasks as database management or the like, as well as run-time libraries of routines that are invoked by these user applications. Although the invention is not limited to a particular platform, in a preferred embodiment hardware layer 1002 may comprise an IBM® S/390® processor, while OS layer 1004 may comprise an instance of the IBM OS/390™ operating system.

Figure 11:
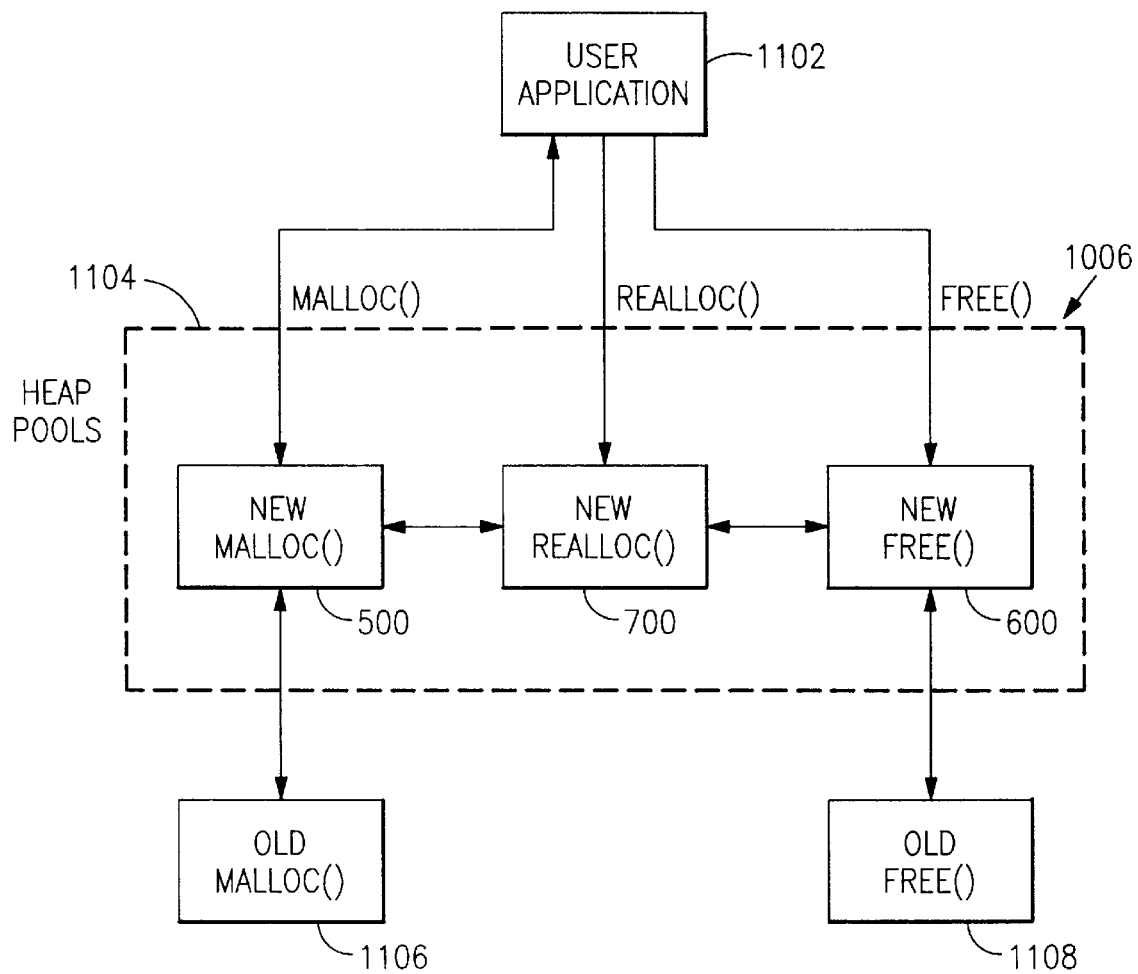
FIG. 11 shows the basic program elements of the present invention and their interrelationship with existing system elements.

The present invention relates to the application layer 1006. More particularly, referring to FIG. 11, the present invention, when enabled, provides a transparent software layer 1104. (sometimes referred to herein as HeapPools) within application layer 1006 between a user application 1102 and an existing malloc( ) routine 1106 and free( ) routine 1108 (referred to herein as "old malloc( )" and "old free( )" to distinguish them from the similarly named routines of the present invention). Any suitable means may be used to control the enablement of the HeapPools layer 1104.

Old malloc( ) routine 1106 functions in a conventional manner to receive a single argument specifying the number of bytes required and return a pointer to the allocated area. Similarly, old free( ) routine 1108 functions in a conventional manner to free a previously allocated memory space referenced by a pointer provided to the routine. Old malloc( ) routine 1106 and old free( ) routine 1108 may be part of a run-time library of routines in application layer 1006 that interact with the OS layer 1004. In general, the manner of operation of routines 1106 and 1108 form no part of the present invention.

In accordance with the present invention, an application 1102 seeking to allocate memory space calls a new malloc( ) (hereinafter simply "malloc( )") routine 500 in layer 1104 rather than the old malloc( ) routine 1106. Malloc( ) routine 500, also shown in FIGS. 5A–5B and described below, allocates memory space to the calling application 1102 by default from its own fixed-size cells to be described, either from a "quick pool free queue" of previously assigned and returned cells or from a pool extent of previously unassigned cells. Malloc( ) routine 500 calls on the old malloc( ) routine 1106 only as needed to service a particular request, such as when the amount of storage requested exceeds the largest cell size or when all the cells of a particular size have been depleted and a new pool extent needs to be allocated.

Figure 6:
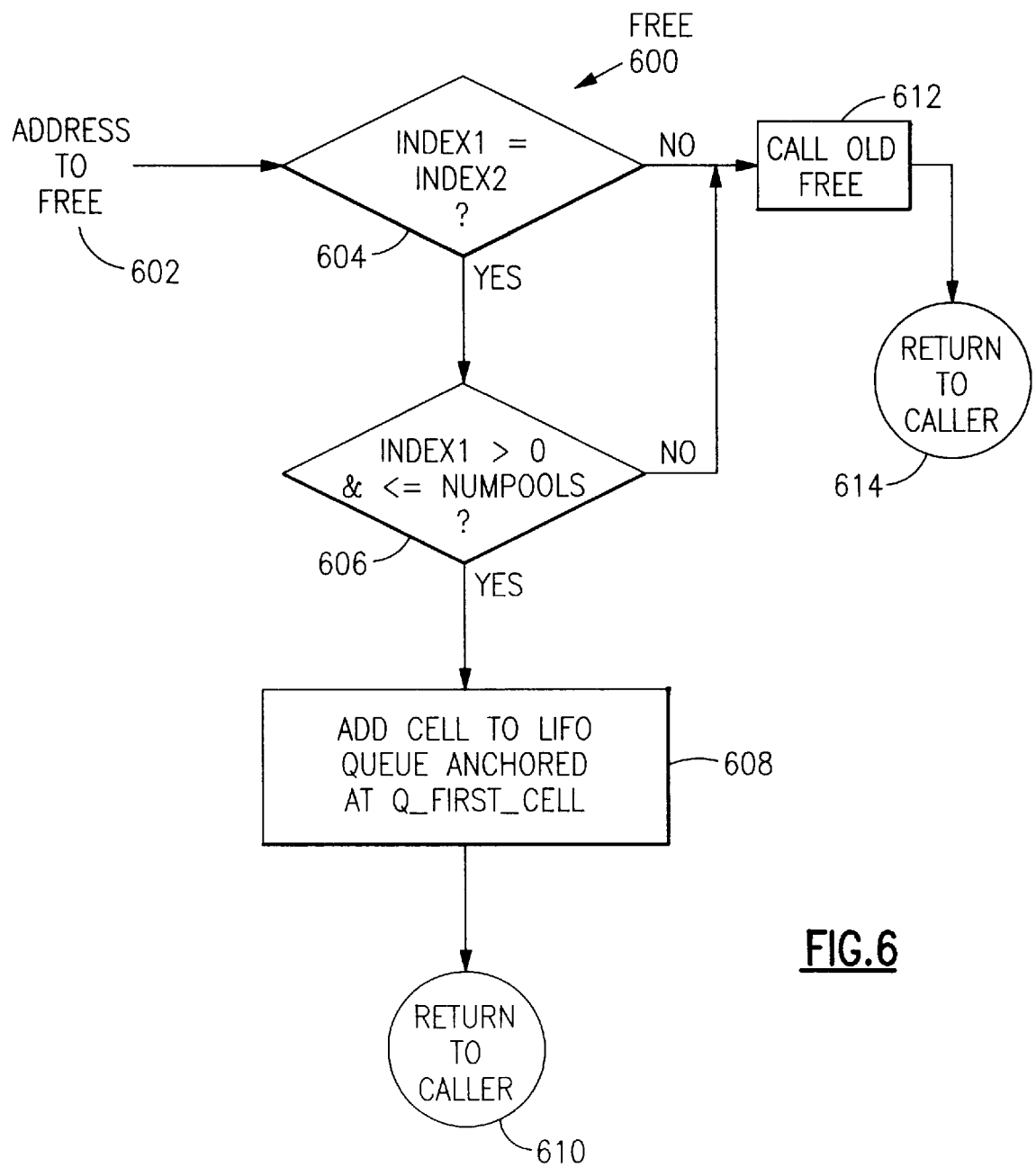
FIG. 6 shows the free( ) routine of the present invention used to free a block of storage.

Similarly, an application 1102 seeking to free previously allocated memory space calls a new free( ) (hereinafter simply "free( )") routine 600 in layer 1104 rather than the old free( ) routine 1108. Free( ) routine 600, which is also shown in FIG. 6, returns memory space from the calling application 1102 either to the quick pool free queue of previously assigned cells or back to unallocated storage (via old free( ) routine 1108), depending on where it originated from.

Figure 7:
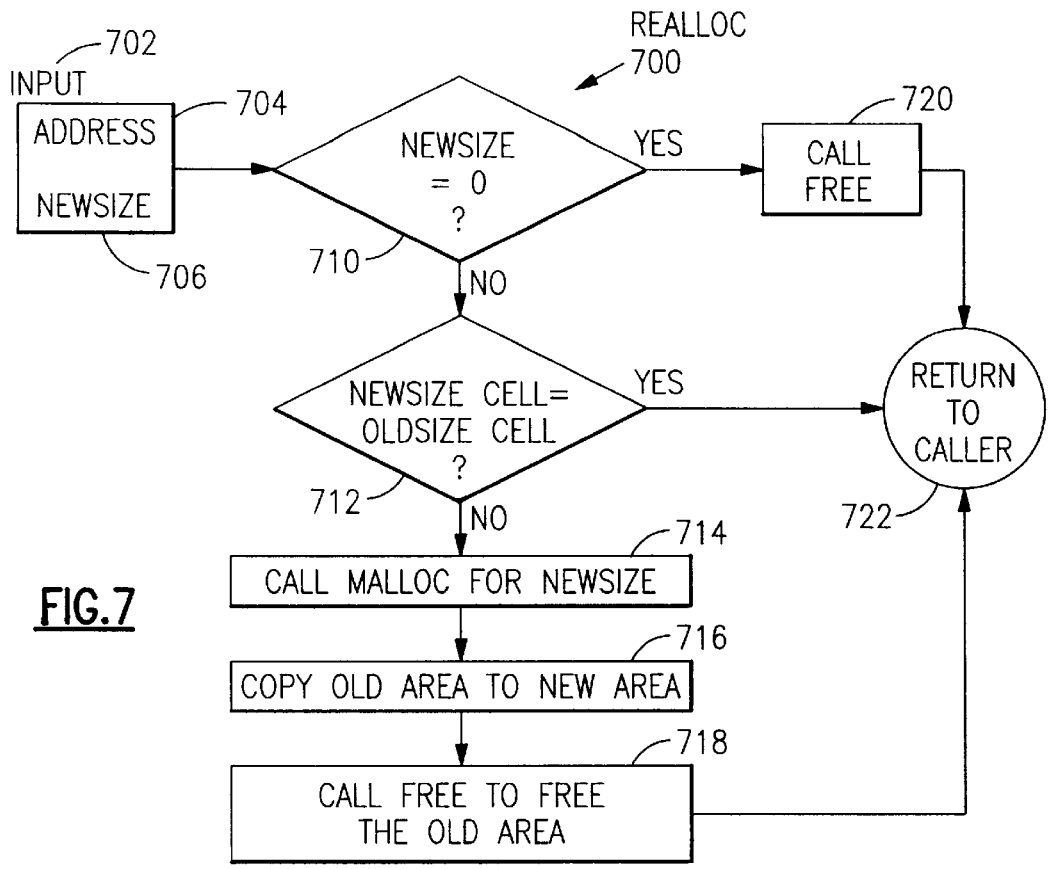
FIG. 7 shows the realloc( ) routine of the present invention used to resize a block of storage.

Finally, an application may call a realloc( ) routine 700 in layer 1104 to return only part of a previously assigned storage block. (There is no "old realloc( )" routine with which routines 500, 600 and 700 interact, hence the simple reference to routine 700 as a realloc( ) routine.) Realloc( ) routine 700, which is also shown in FIG. 7, in turn calls on malloc( ) routine 500 and free( ) routine 600 as appropriate to service the request from application 1102. Realloc( ) routine 700 functions in a conventional manner (as seen by application 1102) to receive a previously provided pointer and requested size reduction and reduce the allocated storage area by the requested amount.

No changes are necessary in the user application 1102 making a call to routines 500, 600 and 700. In each case, it appears to the application 1102 as though it is interacting with a conventional malloc( ) routine 1106, for example. HeapPools layer 1104 intercepts these calls, however, and either processes them itself or passes them on to the existing routines 1106 and 1108 as appropriate.

As described below, the method of the present invention calls the old malloc( ) routine 1106 to obtain a large block of storage which is subsequently divided into fixed-size cells, which are then assigned to the callers of malloc( ) routine 500.

Figure 1:
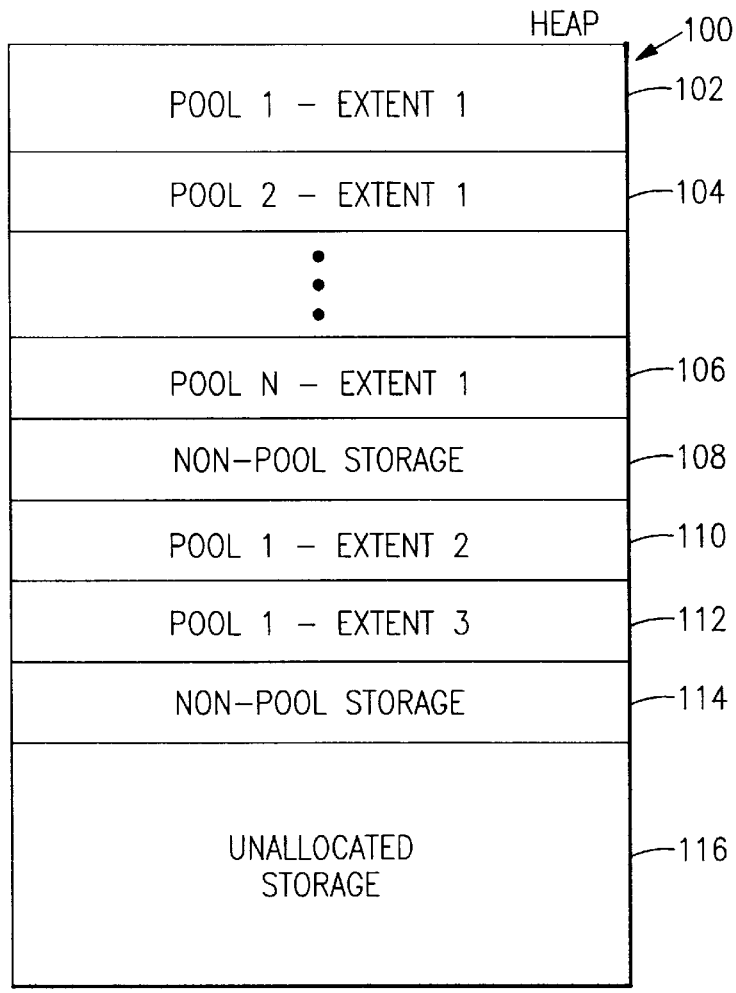
FIG. 1 shows the layout of the pool extents within heap storage.

FIG. 1 shows the layout of a heap 100. As an application 1102 (FIG. 11) issues requests to malloc( ) routine 500 for storage, pool extents are obtained from the unallocated storage area 116 (as at 102–106). Pool extents are only obtained if there is a request for storage from that size pool. If all the cells within a cell extent are allocated, a subsequent request to the malloc( ) routine 500 will cause another cell extent to be allocated from the unallocated storage area 116 (as at 110–112) via the old malloc( ) routine 1106. So after an application 1102 runs for a while, there may be none or many pool extents for each size pool, depending on the malloc( ) requests from the program. Any requests to the malloc( ) routine 500 for storage (as at 108 and 114) larger than the largest pool size are satisfied by the old malloc( ) routine 1106 directly. The are of the heap 100 that is not yet allocated to a pool (as at 102) or user segment (as at 108) is simply unallocated storage 116.

Figure 2:
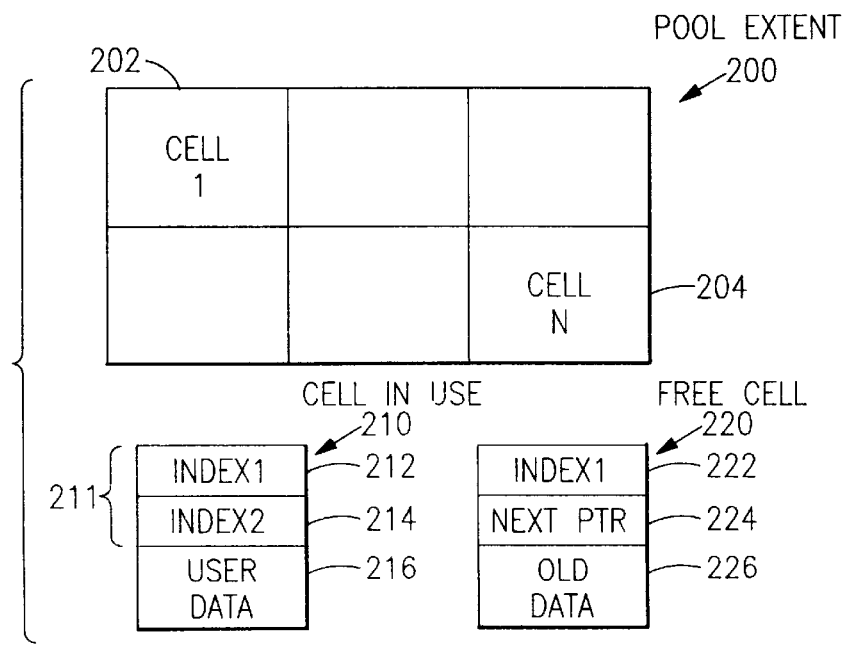
FIG. 2 shows the layout of cells within a pool extent and the format of individual cells when in use or on the free queue.

FIG. 2 shows a pool extent 200. Each pool extent 200 has a first cell 202 (cell 1) and a last cell 204 (cell N). The cells are assigned from the first cell 202 to the last cell 204 in sequential order. Once a cell has been assigned from the pool extent 200, it is never returned to the extent. Once a cell 210 has been assigned to the application 1102 by malloc( ) routine 500, the cell header 211 is initialized. The cell header 211 contains two words, each of which is 4 bytes (32 bits) in length; the first word is defined as INDEX1 212 and the second word is defined as INDEX2 214. Following the cell header 211 is the portion of the cell that is provided for user data 216. Malloc( ) routine 500 returns the address of the user data area 216 to the application 1102. Malloc( ) routine 500 uses the cell header 211 for its own record-keeping purposes, as described below. Existing C storage management algorithms such as old malloc( ) routine 1106 also use a header area of similar size to keep track of the size of the storage area. However, malloc( ) routine 500 uses distinguishable header values to permit the free( ) routine 600 to determine the origin of a block being returned, as described below.

The cell header 211 itself is not used by the requesting application 1102, which uses only the user data area 216. Thus, a cell of n bytes for the purposes of the requesting application 1106 actually contains at least n+8 bytes if the length of the header 211 is taken into account.

When a cell is freed 220, it is placed on a quick pool free queue 218 (FIG. 12) by appropriate manipulation of the values in its header 211. (The actual location of the cell remains unchanged.) The second word in the header 211 is used as a NEXT POINTER 224. The INDEX1 field in a free cell 222 is left set to the pool index. How these fields are set in the malloc( ) and free( ) routines 500 and 600 is described below. (As described below, queue 218 is a LIFO structure that might just as well be referred to as a stack. However, the term "queue" is used herein with the understanding that it covers a LIFO structure.)

Figure 3:
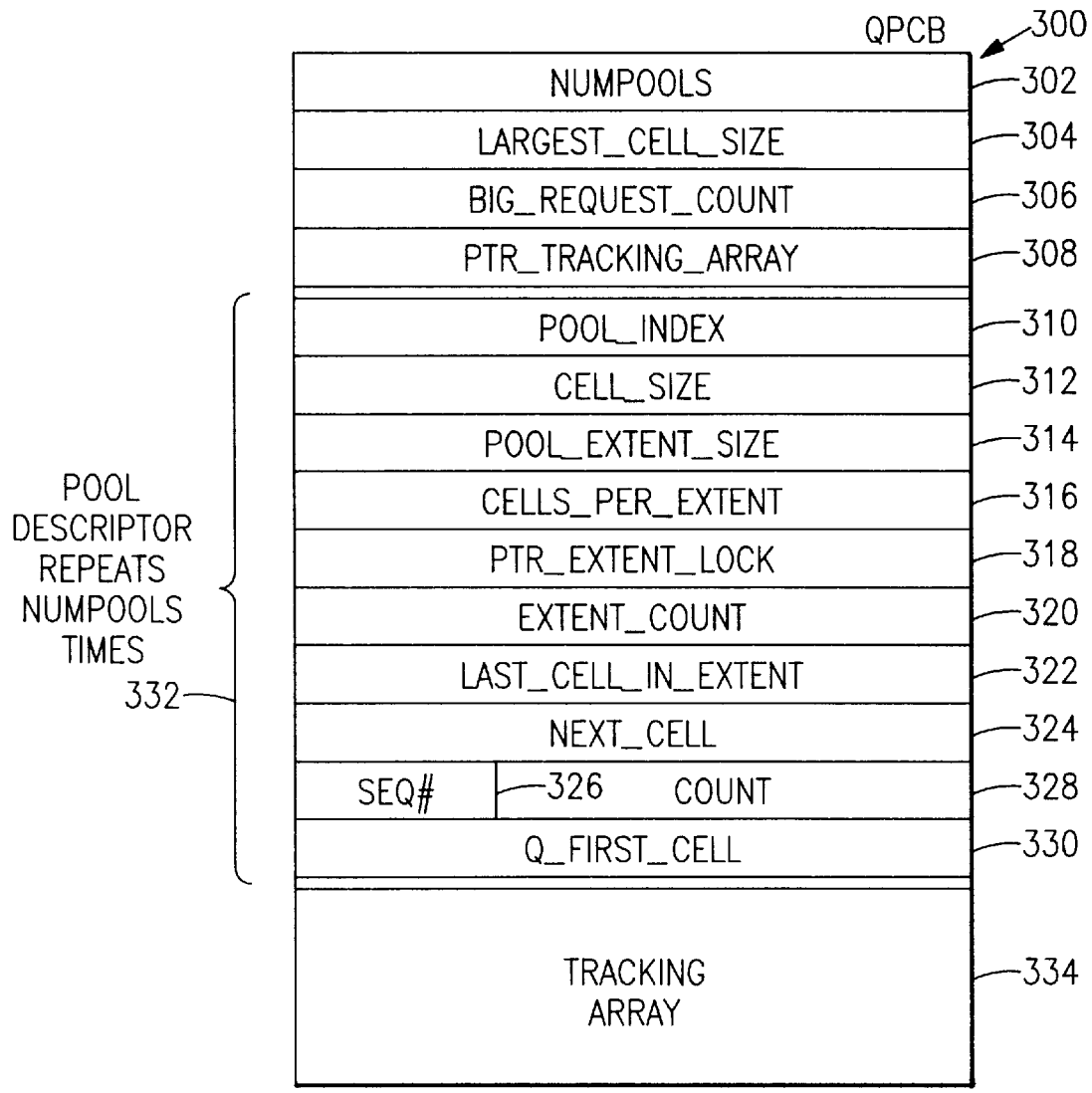
FIG. 3 shows the quick pool control block (QPCB) used to manage the storage in each of the pools.

FIG. 3 shows the quick pool control block (QPCB) 300 that is used to manage the different storage pools. During initialization of the programming environment, QPCB 300 is obtained and initialized. QPCB 300 has a header (fields 302–308) followed by one or more pool descriptors 332 (fields 310–330) and a tracking array 334, an area of storage following the pool descriptors 332 where the malloc( ) routine 500 maintains, in a 256-element array QPCB_STORAGE_HITS(S), counts of the number of storage requests for sizes less than LARGEST_CELL_SIZE 304.

In the header, NUMPOOLS 302 is set based on the number of different storage: pool sizes specified by the input or default settings. LARGEST_CELL_SIZE 304 is recorded for use by the malloc( ) routine 500 in determining whether a storage request can be satisfied by one of the cell pools. BIG_REQUEST_COUNT 306 is used to track the number of malloc( ) requests which fall outside the range of the largest pool size 200 (FIG. 2). This algorithm runs optimally when BIG-REQUEST_COUNT 306 is small. If the storage report shows a BIG_REQUEST_COUNT 306 that is high, the user can specify larger pool sizes on the next running of the program. PTR_TRACKING_ARRAY 308 is a pointer to the tracking array 334.

The pool descriptor section of QPCB 300 is variable in size, depending on the number of cell pools (NUMPOOLS 302) requested. Each pool descriptor 332 in this section has the fields 310–330 shown in FIG. 3 and defined below.

Figure 12:
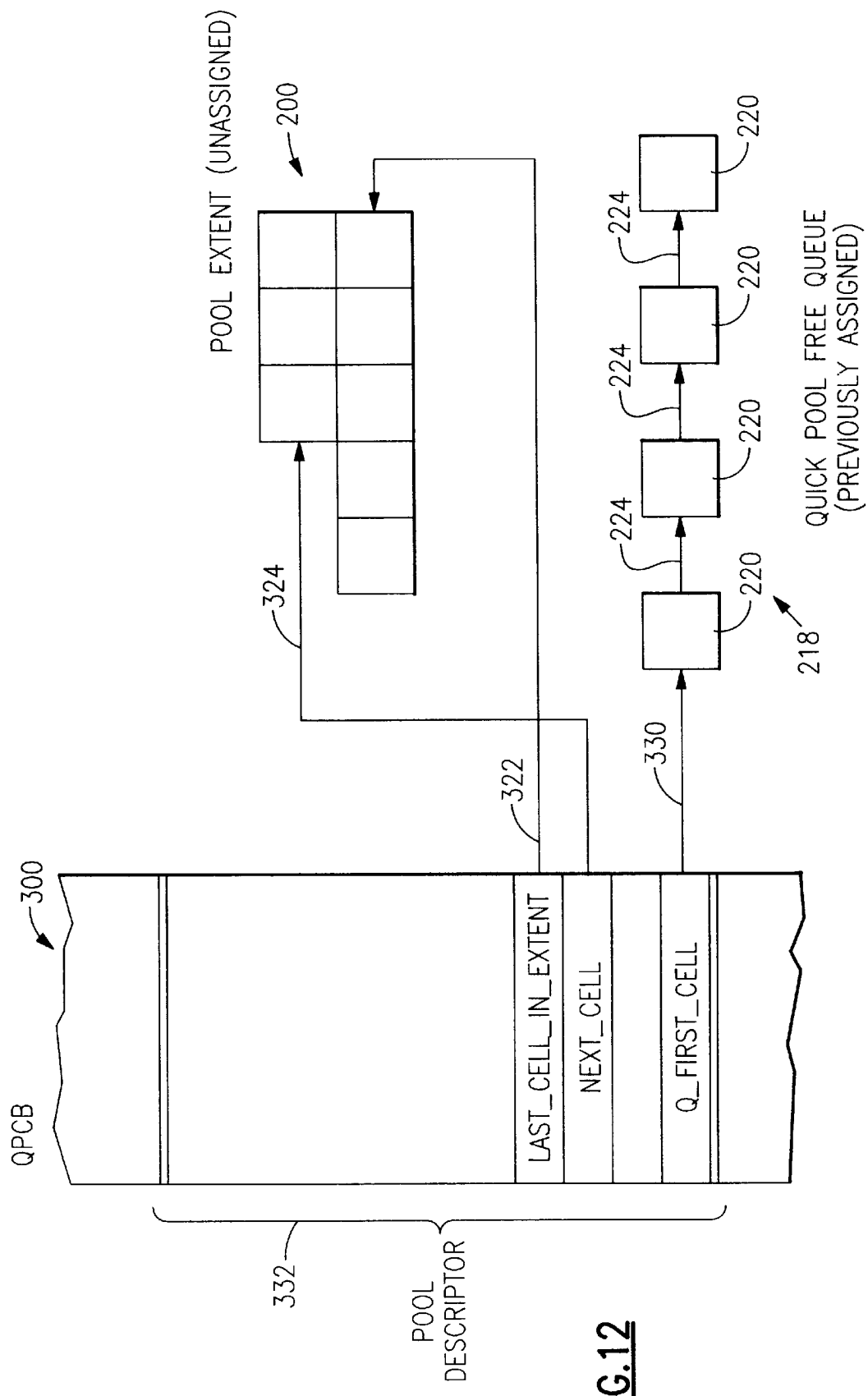
FIG. 12 shows the interrelationship between the quick pool control block shown in FIG. 3 and the data structures shown in FIG. 2.

POOL_INDEX 310 contains an index into the pool array. The first pool, for the smallest elements, has an index of 1, and the last pool, for the largest elements, has an index equal to NUMPOOLS 302. CELL_SIZE 312 contains the size of the cells within this pool. This is used during malloc( ) processing to determine which pool should be used to satisfy the current request. POOL_EXTENT_SIZE 314 contains the size of a pool extent 200 (FIG. 2). This is the size that is passed to the old malloc( ) routine 1106 when it is necessary to grow the pool by getting another pool extent. This field is set by input passed into the initialization routine (to be described) or set by default. This allows the user to allocate appropriate amounts of storage to the various pools. CELLS_PER_EXTENT 316 describes how many cells can fit within a given POOL_EXTENT_SIZE 314. PTR_EXTENT_LOCK 318 represents a pointer to a lock area which is used to perform an exclusive lock operation, as described further below. EXTENT_COUNT 320 is used to keep track of how many extents have been obtained. This is used strictly for the storage report. LAST_CELL_IN_EXTENT 322 contains the address of the last cell 204 in the current active extent 200, as shown in FIG. 12. This is used to quickly determine when the last cell 204 is being given out. NEXT_CELL 324 contains a pointer to the next available cell in the pool extent, as also shown in FIG. 12. When a cell pool extent 200 is first allocated, this is set to point to the first cell 202. As a cell is removed from the pool extent 200, this pointer is moved along to point to the next cell in the pool extent. When the last cell 204 in an extent 200 is given out, this field is set to zero. NEXT_CELL 324 is updated with an atomic instruction such as Test and Set or Compare and Swap. The next three fields, SEQ# 326, COUNT 328 and Q_FIRST_CELL 330, are also updated with an atomic instruction. SEQ# 326 contains an increasing, wrapping sequence number which is used to guarantee serialization of the queue 218. COUNT 328 is used to keep track of how many free cells are on the free queue 218. Q_FIRST_CELL 330 contains a pointer to the first cell on the quick pool free queue 218, as shown in FIG. 12.

Figure 4:
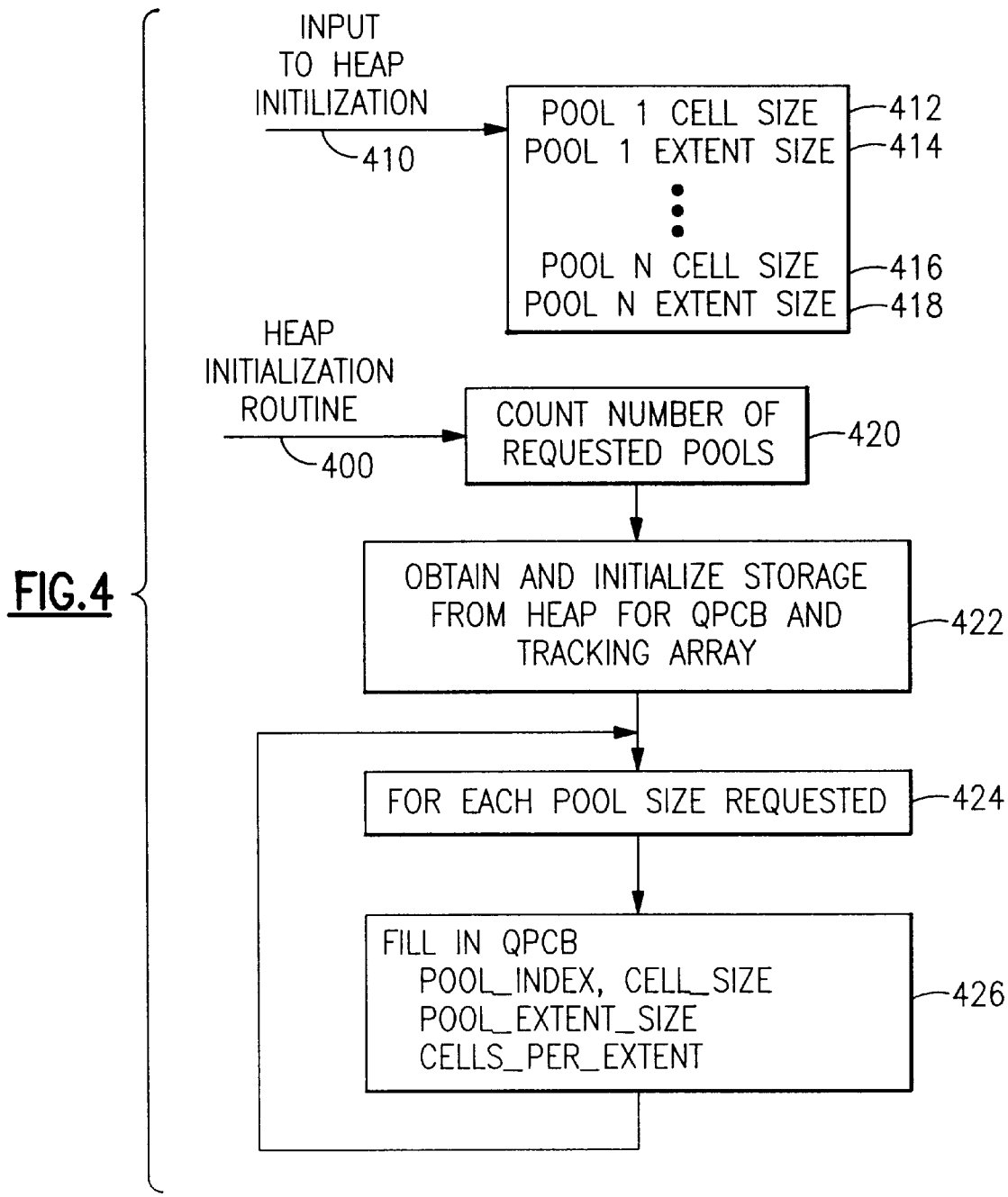
FIG. 4 shows the initialization routine for the quick pools.

FIG. 4 shows the heap initialization routine 400, which gets control at the start of the procedure. Input 410 to the heap initialization routine 400 contains the size of pool 1 (POOL, 1 CELL SIZE 412) and the amount of the heap to be allocated for each pool extent in pool 1 (POOL 1 EXTENT SIZE 414). These pairs of sizes repeat until the last pool size 416 and last pool extent size 418 are specified. The pool sizes 412 to 416 can be specified in increasing order or sorted by the initialization routine 400. Any pool sizes that are not specified by the input 410 to the heap initialization routine take default values that are specified by the programming environment using this procedure. Any one of a number of means (including hardcoding) may be used to supply input 410 to the heap initialization routine 100.

When the heap initialization routine 400 gets control, it first counts the number of cell pools it is supposed to manage (step 420). Then storage for the QPCB 300 is obtained using the old malloc( ) routine 1106 (step 422). Then, after being reset to all zeros, the QPCB 300 is initialized with the number of pools (NUMPOOLS 302) and the LARGEST_CELL_SIZE 304. PTR_TRACKING_ARRAY pointer 308 is then set to point to the tracking array 334 following the last of the cell pool descriptors 332.

The heap initialization routine 400 then processes each of the specified pool sizes from the input 410. For each pool size specified (step 424), the fields in QPCB 300 for the corresponding pool descriptor 332 are set (step 426); specifically, POOL_INDEX 310 is set to the loop counter controlling the loop 424, CELL_SIZE 312 is set from the input 412, POOL_EXTENT_SIZE 314 is set from the input 414, and CELLS_PER_EXTENT 316 is calculated by dividing POOL_EXTENT_SIZE 314 by CELL_SIZE 312.

Once heap initialization 400 is complete, the environment is ready to handle malloc( ), free( ) and realloc( ) requests from the application 1102.

Figure 5A:
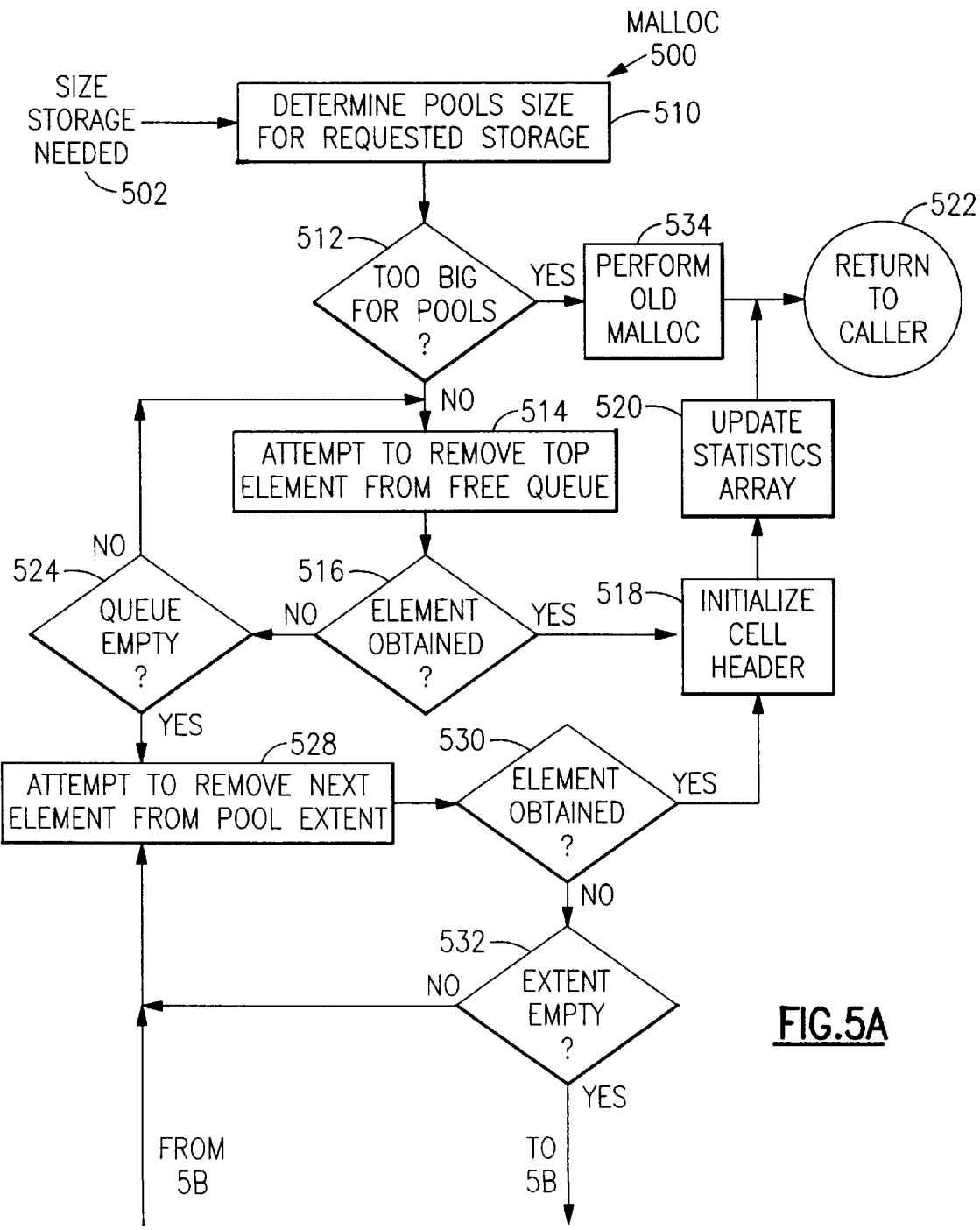
FIGS. 5A–5B show the malloc( ) routine of the present invention used to allocate a block of storage.
Figure 5B:
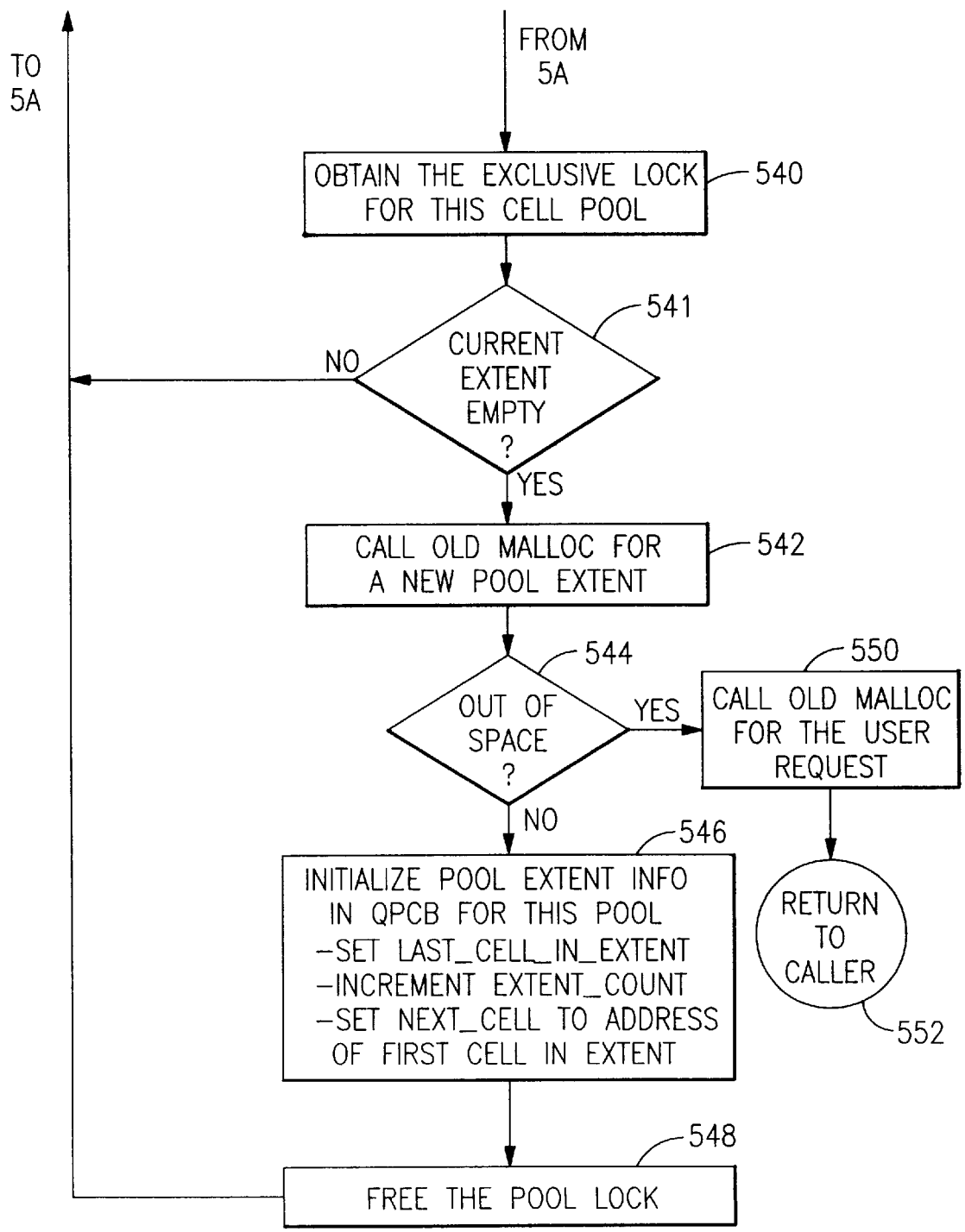

FIGS. 5A–5B show the malloc( ) routine 500 of the present invention. Malloc( ) routine 500 receives a single input 502, which is the size of the storage element needed by the application 1102. The malloc( ) routine 500 first determines whether the storage request can be satisfied from one of the cell pools (step 510). If the storage size 502 is less than LARGEST_CELL_SIZE 304, then the routine loops through the cell pool descriptors 332 for each of the cell pools. As soon as the requested size 502 is less than or equal to CELL_SIZE 312, then the cell pool is known. If the storage size is too big for any of the cell pools (step 512), then the request is passed along to the old malloc( ) routine 1106 (step 534), which obtains storage from the heap 108 or 114 as shown in FIG. 1. After obtaining storage, the old malloc( ) routine 1106 returns directly to the caller (step 522).

If the storage size 502 does fit within one of the pools, then the cell pool descriptor area 332 of the QPCB 300 is now known. Next, an attempt is made to remove the first element from the free queue 218 (step 514). This is done using a hardware instruction which provides an atomic test followed by a setting of the target field. The following steps define how this atomic operation is processed:

1. The values of SEQ# 326, COUNT 328 and Q_FIRST_CELL 330 are copied out of the QPCB 300.
2. If the Q FIRST_CELL 330 value is zero, then the queue 218 is empty and control flows to step 528 in FIG. 5A (step 524).
3. If the Q FIRST_CELL 330 value is not zero, then the local copy of the SEQ# 326 is incremented (wrapping to zero is OK). The local copy of COUNT 328 is decremented since an element is being removed from the queue 218.
4. The local copy of Q_FIRST_CELL 330 points to a free cell 220. The NEXTPTR 224 field contains the address of the next element on the free queue 218. This NEXTPTR 224 value is copied to be used as the new value for Q_FIRST_CELL.
5. Now the atomic operation is performed. This compares the saved old values of SEQ# 326, COUNT 328 and Q_FIRST_CELL 330 to the values currently active in the QPCB 300. If the compare shows they are still equal, the values of these fields are replaced by the new values calculated in steps 3 and 4 and control flows to step 518 in FIG. 5A (step 516). If the compare shows that the values in the QPCB have changed, then control flows back to step 1.

The above steps 1 through 5 are conventional LIFO queue manipulation algorithms and are not as such part of the present invention.

As noted above, if an element could not be obtained (step 516) and the Q_FIRST_CELL 330 value is zero, then that implies the free queue 218 is empty (step 524) and control flows to step 528.

At step 528, an attempt is made to remove a cell 202 from a cell pool extent 200. This also uses an atomic hardware instruction and uses the following steps:

1. The value of NEXT_CELL 324 is copied from the QPCB 300.
2. If the value of NEXT_CELL 324 is 0, then there are no more available cells in the current extent and control flows to FIG. 5B (step 532).
3. At this point, the algorithm determines the new value to be stored in NEXT_CELL 324. If NEXT_CELL is currently the same as LAST_CELL_IN_EXTENT 322, then this is the last cell 204 and the new value for NEXT_CELL 324 is set to zero. If NEXT_CELL 324 is not the same as LAST_CELL_IN_EXTENT 322, then the new value for NEXT_CELL 324 is set to NEXT_CELL +CELL_SIZE 312.
4. Now the atomic operation is performed on NEXT_CELL 324. This compares the old value of NEXT_CELL 324 to the saved value of NEXT_CELL 324 and, if they are equal, replaces the value in NEXT_CELL 324 with the value calculated in step 3.
5. If the atomic operation is successful, then an element has been obtained (step 530) and control flows to step 518. If the atomic operation fails, then control flows back to step 1 above.

At step 518, a cell has been obtained either from the quick pool 218 at step 516 or from the cell pool extent 200 at step 530. The cell header 21 1 is initialized, setting INDEX1 212 to the POOL_INDEX 310. INDEX2 224 is also set to the same POOL_INDEX 310. The reason for setting both INDEX1 212 and INDEX2 214 to the same value is that it makes it easy for the free( ) routine 600 to distinguish cells from the cell pool 200 and storage which is obtained by the old malloc( ) routine 1106 in step 534. The old malloc( ) routine 1106 also initializes an INDEX1 212 and INDEX2 214 field in a header, but initializes them to different values. This will become more clear in the explanation of the free( ) routine 600.

After the cell is initialized in step 518, the return value to the caller of malloc( ) is set to the address of the USER DATA 216. The malloc( ) routine 500 then updates the statistics array QPCB_STORAGE_HITS(S) in tracking area 334 (step 520) before returning to the caller (step 522).

Because of the granularity of cell sizes, the requesting application 1102 may be (and typically is) allocated a block of storage that exceeds the size requested. The application 1102 has no awareness of this excess storage, though, since it receives back only a single return value, the pointer to the user data area 216. By appropriate selection of cell sizes and amounts of storage requested, however, such wastage may be minimized.

We now go back to FIG. 5B, which got control because the quick cell pool 218 was empty and the cell pool extent 200 was also exhausted. Since this logic cannot be serialized with a simple atomic instruction, it is necessary to obtain serialization at this point to handle the case where multiple threads could be requesting storage simultaneously while running on multiple CPUs. This serialization could take the form of a mutex or semaphore, which are known serialization methods used in computing. In this description, the PTR_EXTENT_LOCK 318 represents a pointer to a lock area which is used to perform an exclusive lock operation. The particular method of locking forms no part of the present invention. Once the lock is obtained (step 540), it is necessary to check that NEXT_CELL 324 is still 0 (step 541). If it is not 0, then this thread lost the race for the extent lock 3 18, and the other thread has already obtained a new extent for this pool. In this case, the lock 318 is released and control flows to step 528 in FIG. 5A. If no other thread has extended the pool while this thread is attempting to get the lock 318, a call is made to the old malloc( ) routine 1106 (step 542) to obtain a new cell extent of size POOL_EXTENT_SIZE 314.

It is possible that the old malloc( ) routine 1106 is not able to obtain sufficient storage to satisfy the request for POOL_EXTENT_SIZE 314. If the unallocated storage area 116 of the heap 100 is almost exhausted and the old malloc( )

routine 1106 fails, then the lock 318 is released and the original size requested 502 is passed to the old malloc( ) routine 1106 (step 550) The old malloc( ) routine 1106 either works or fails and returns results directly back to the caller (step 552).

If the old malloc( ) routine 1106 successfully returns a new pool extent, then the fields in the QPCB 300 for this cell pool 332 are updated (step 546). Specifically, the LAST_CELL_IN_EXTENT 322 is updated first with the address of the last cell 204 in the new extent. The EXTENT_COUNT 320 is incremented by 1. Last of all, the NEXT CELL 324 is set to the address of the first cell 202 in the new extent. It is important to set the NEXT_CELL 324 last because other threads could be attempting to obtain a cell in step 528 and this can only be done if the LAST_CELL_IN_EXTENT 322 is accurate for the current extent. After the new extent is successfully in place, the extent lock 318 is released and control flows to step 528 in FIG. 5A.

FIG. 6 shows the free( ) routine 600 of the present invention, used to return storage from a user application 1102. The only input to the free( ) routine 600 is an address 602, which points to the user data 216 within a cell. The free( ) routine 600 compares INDEX1 212 and INDEX2 214 to determine if they are equal (step 604). It also performs additional validity checking to make sure INDEX1 falls within the range of acceptable POOL_INDEX 310 values (step 606).

If the index values fail any of these tests, the free( ) request is passed along to the old free( ) routine 1108 (step 612), which returns directly to the caller (step 614). The old free( ) routine 1108 is thus given control if the old malloc( ) 1106 routine was used to obtain the storage, the application has corrupted the index values 212 or 214 in the cell header 211, or the user has passed in a bad address 602 to the free( ) routine 600. In any case, any cell headers 211 not recognizable as such cause the request to be passed along to the old free( ) routine 1108 at step 612.

Assuming the cell header 211 is valid, the INDEX1 212 value is used to get addressability to the appropriate QPCB 300 extent information 332.

Next, an attempt is made to add the passed element to the free queue 218 (step 608). This is done using a hardware instruction which provides an atomic test followed by a setting of the target field. The following steps define how this atomic operation is processed:

1. The values of SEQ# 326, COUNT 328 and Q_FIRST_CELL 330 are copied out of the QPCB 300 for the appropriate cell pool 332.
2. The value of INDEX2 214 in the cell being freed is set to the old value of Q_FIRST_CELL. Basically, the free cell is being put on the front of a LIFO queue 218. This may be zero or the address of the current head of the free queue 218
3. The new Q_FIRST_CELL 330 value is set to the address of the cell 210 that is being freed.
4. The value of the new SEQ# 326 is set to the old SEQ# 326 plus one, since this is just a uniqueness counter. It may wrap to 0, which is OK. The value of the new COUNT 328 is incremented since an element is being added to the queue 218.
5. Now the atomic operation is performed. This compares the saved old values of SEQ# 326, COUNT 328 and Q_FIRST_CELL 330 to the values currently active in the QPCB 300. If the compare shows they are still equal, the values of these fields are replaced by the new values calculated in steps 3 and 4 and control flows to step 610. If the compare shows that the values in the QPCB have changed, then control flows back to step 1.

The above steps 1 through 5 are conventional LIFO queue manipulation steps and are not as such part of the present invention.

After the element is freed, control returns to the caller (step 610).

FIG. 7 shows the realloc( ) routine 700 of the present invention. The input 702 to the realloc( ) routine 700 contains two pieces of information. It contains the address 704 of a piece of storage previously obtained with malloc( ) and it contains a NEWSIZE 706 that the caller wants the storage to be. Generally realloc( ) routine 700 is used when a large area is obtained, partially filled in, then reallocated to avoid wasting extra space. It can also be used to grow an area that is too small.

The realloc( ) routine 700 first checks the NEWSIZE 706 to see if it is zero (step 710). If it is zero, the request is to free the area and a call is made to the free( ) routine 600 (step 720). If the NEWSIZE 706 is not zero, then the realloc( ) routine 700 determines whether the NEWSIZE 706 will fit in one of the pools. This is the same logic as was described in FIG. 5A, step 510, and will therefore not be repeated here. The header 211 is examined to determine if it is in a pool (INDEX1 212 is equal to INDEX2 214) and the INDEX1 212 value is compared to the POOL_INDEX 310 for the NEWSIZE 706. If there is no change in the pool size (step 712), then the storage allocation is not made and control is returned to the caller (step 722). If the size of the storage does need to change, then the malloc( ) routine 500 is called to obtain a new piece of storage (step 714). The malloc( ) routine 500 either obtains a cell or calls the old malloc( ) routine 1106 for storage areas larger than LARGEST_CELL_SIZE. In either case, the realloc( ) routine 700 gets back the address of an area of storage to use. Next, the old area pointed to by ADDRESS 704 is copied to the new area obtained in step 714 (step 716). The realloc( ) routine 700 then calls the free( ) routine 600 to free the old area pointed to by ADDRESS 704 (step 718). Finally, the address of the new storage area obtained in step 714 is returned to the caller (step 722).

Figure 8:
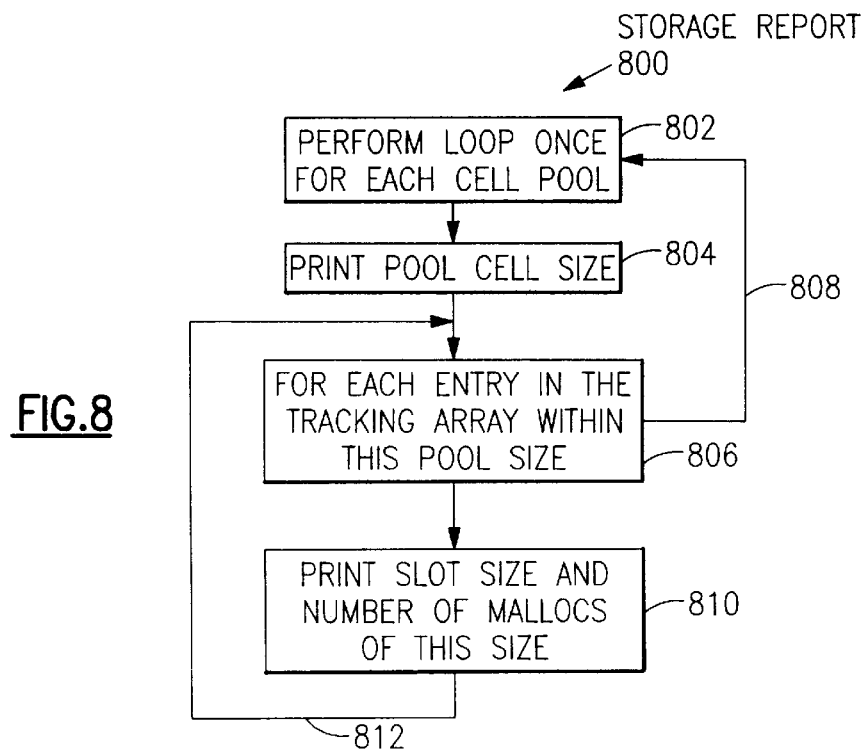
FIG. 8 shows the routine used to produce a storage report of the cell pool usage for an application.

FIG. 8 is a flowchart of the storage report routine 800. The storage report provides feedback to the person running the application so that subsequent runs of the program will have optimal storage usage. By tuning the input 410 to heap initialization, one can specify cell and pool extent sizes that waste a minimum amount of space.

The storage report routine 800 loops through each of cell descriptor areas 332 in the QPCB 300 (step 802) and prints out a line of output describing the CELL_SIZE 312 for that pool (step 804). It then enters a loop 806 where it processes each entry in the tracking array 334 for storage sizes less than or equal to the CELL_SIZE 312. If the size represented by the tracking array entry is greater than the CELL_SIZE 312, then the algorithm loops back (step 808) to process the next pool descriptor 332. If the size represented by the TRACKING ARRAY 334 is less than or equal to the CELL_SIZE 312 and the count of malloc( )s for that size is greater than zero, an output line is generated describing the request size and the number of malloc( )s which occurred during the execution of the program (step 810). After the line is printed, the program loops; back (step 812) to process the next entry in the tracking array 334.

Figure 9A:
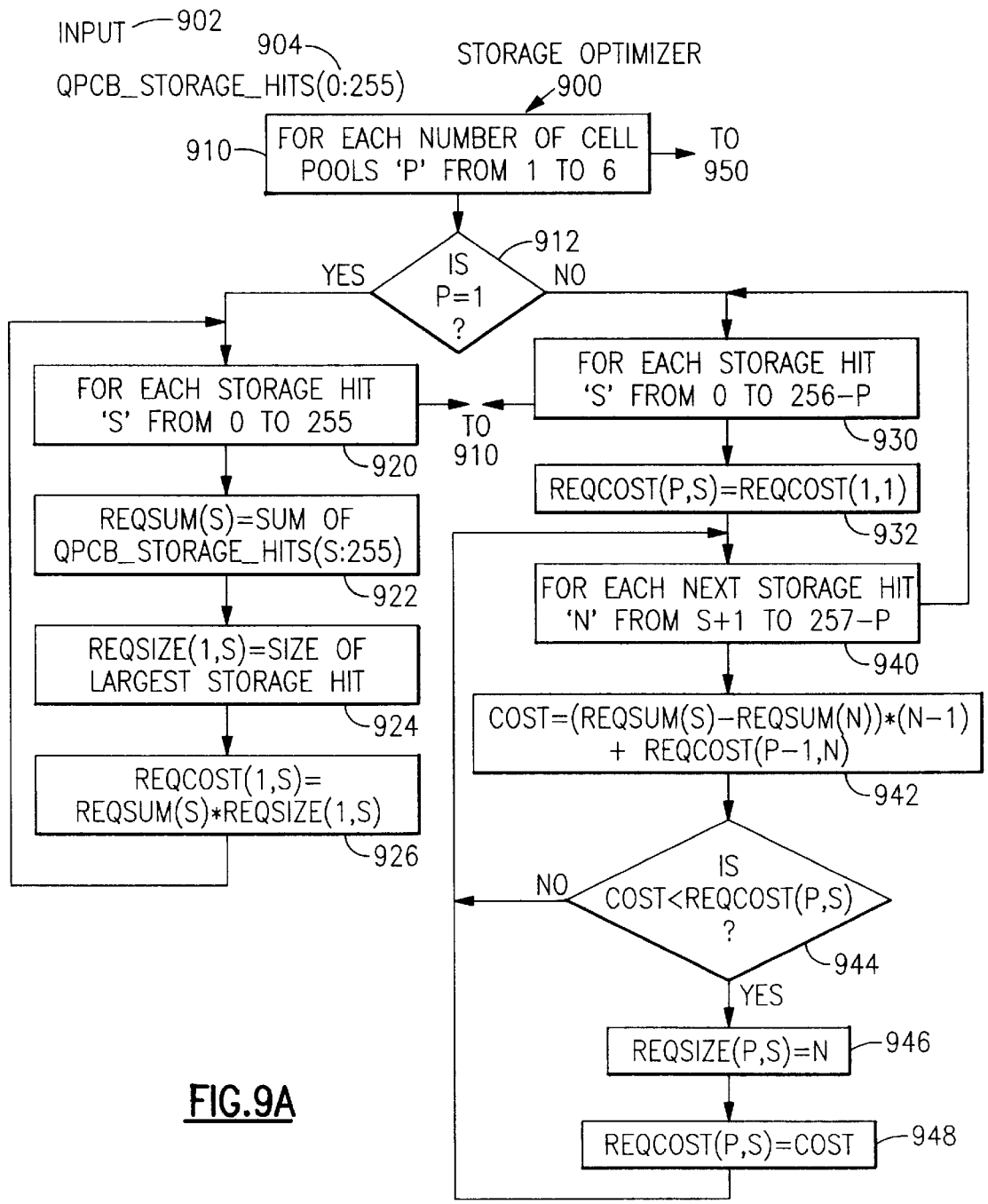
FIGS. 9A–9B show the routine used to calculate optimal settings for the cell sizes and extent allocations.
Figure 9B:
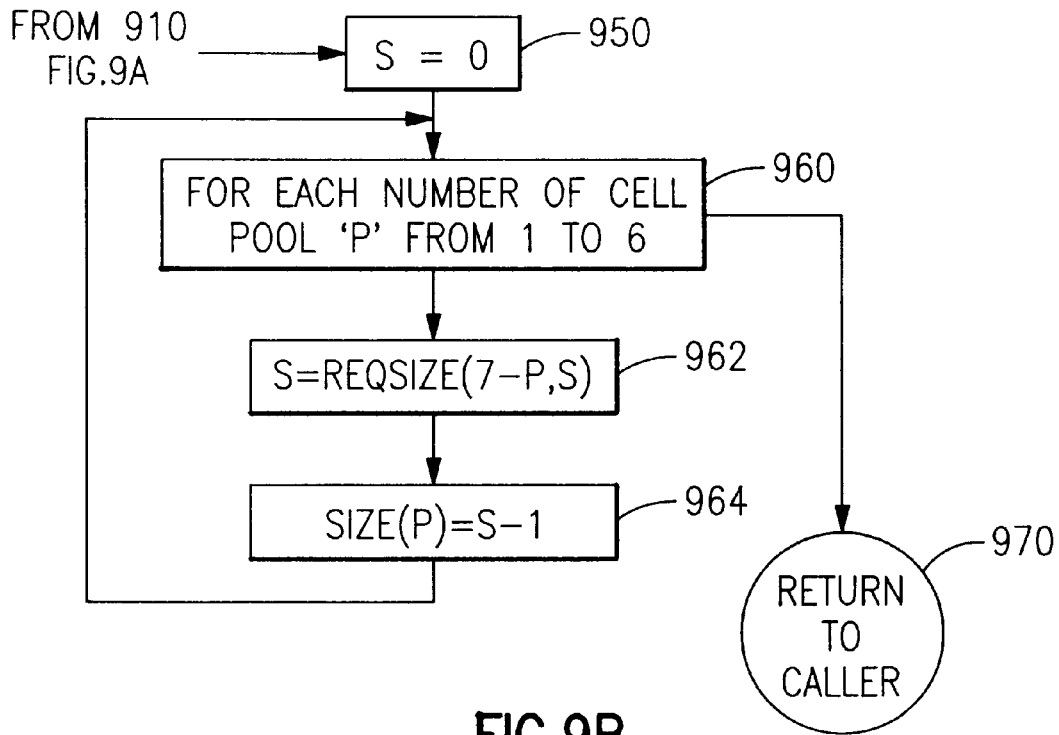

FIGS. 9A–9B show the optimal cell size routine 900. The input 902 to routine 900 contains one piece of information, the number of requests for storage of sizes 8 bytes through 2048 bytes in 8-byte units indexed from 0 to 255 QPCB_

STORAGE_HITS(0:255) 334. The values for maximum cell size, maximum number of cell pools, and storage hit granularity used here are exemplary only, and other values could be used.

The optimize routine 900 loops through each possible number of cell pools P from 1 to 6 (step 910). For the first cell pool (step 912) the routine 900 loops through each different storage size S from index 0 to index 255 (step 920). For each different storage size, it saves the sum of QPCB_STORAGE_HITS(S) 334 up to and including QPCB_STORAGE_HITS(255) 334 into REQSUM(S) (step 922), saves the size of the largest $QPCB_{13}$ STORAGE_HITS (0:255) 334 entry with a non-zero value in REQSIZE(1,S) (step 924), and calculates the total storage required for REQSUM(S) requests from 922 of size REQSIZE(1,S) from 924 by multiplying them together and saving the result in REQCOST(1,S) (step 926).

For each cell pool after the first (step 912), the routine 900 loops through each different storage size S from index 0 to index 256−P (step 930). The routine 900 then initializes the storage required REQCOST(P,S) to REQCOST(1,1) from 926 which contains the maximal value (step 932), loops through each next storage size N from index S+1 to index 257−P (step 240), and calculates the storage required by multiplying the number of storage requests from size S up to but not including size N by the size of request N−1 and adding the result to REQCOST(P−1,S) (step 942). If the storage required from 942 is less than REQCOST(P,S), then the routine 900 saves the storage required from 942 in REQCOST(P,S) (step 946) and saves the size used in REQSIZE(P,S) (step 948).

Referring now to FIG. 9B, starting with a size S of zero (step 950), the routine 900 loops through each possible number cell pools P from index 1 to index 6 (step 960). The next starting size S is REQSIZE(7−P,S) (step 962). The size of cell pool P is size S−1 (step 964). The routine 900 then returns to the caller (step 970).

There are several extensions to the basic logic above. First, the input array 334 may be copied to another array which excludes zero values, preserving the original indices. Also, additional input 902 identifying the maximum number of cells in use per cell pool may be provided, and the number of requests for a given size may be reduced to this value. Loop 910 may be optimized by using a starting index, removing check 912 and performing steps 920–926 before the loop. Loop 940 may be optimized by performing array references in steps 944–948 before the loop. Further, observe that REQSIZE(P,S) determined at 946 will always be equal or greater than REQSIZE(P,S−1), so this latter value may used as the starting index for loop 940.

The logic for calculating optimal HeapPool settings is shown in the C code reproduced in Appendix A.

A sample storage report with HeapPools(ON) is reproduced in Appendix B.

The HeapPools Statistics section of the report lists the number of requests per 8 byte range in each pool specified and the number of requests that fell outside of HeapPools. In that section:

Pool p size: ssss p—pool number ssss—size specified for each cell

Successful Get Heap requests: xxxx-yyyy n xxxx—low side of 8 byte range yyyy—high side of 8 byte range n—number of requests in the 8 byte range Requests greater than the largest cell size: m m—number of storage requests not satisfied by HeapPools Note: Values displayed in the "HeapPools Statistics" report are not serialized when collected so the values are not exact.

The HeapPools Summary section summarizes HeapPool statistics and gives suggested cell size and percentage values. In that section:

Cell Size: Cell size specified in HeapPools Runtime option

Extent Percent: Cell pool percent specified by HeapPools Runtime option

Cells Per Extent: Number of cells per pool extent, calculation: (Initial Heap Size * (Extent Percent/100))/(8+ Cell Size) With a minimum of one cell. It is not a good idea to have only one cell per extent. If this occurs and this pool allocates many extents the HeapPools algorithm will be slower than the old malloc( ).

Extents Allocated: Number of times each pool allocated an extent. To optimize storage usage then the extents allocated should be one or two. Increase the percentage for this pool if extents allocated is too high.

Maximum Cells Used: This is the "high water mark", the maximum number of cells used for each pool.

Cells In Use: Number of cells never freed. A large number here could mean there is storage leak.

Suggested Percentages for current Cell Sizes: Assuming cell sizes will stay the same and the application will malloc( )/free( ) with the same frequency; percentages are calculated to find the optimal size of the cell pool extent. Calculation: (Maximum Cells Used * (Cell Size+8)*100)/Initial Heap Size With a minimum of 1% and a maximum of 90%. Having only one cell per extent is the worst case scenario for the HEAPPOOLS algorithm, so make sure your percentages are large enough to have more than one cell per cell pool extent. Having the cell pool extent too large will not slow down the HeapPools algorithm but it will cause additional, unreferenced virtual storage to be allocated, so make sure the percentages are not so large that it would cause the program to exhaust the region size.

Suggested Cell Sizes: Assuming the application will malloc( )/free( ) with the same frequency; sizes are calculated to optimally use storage. The suggested cell sizes are given with no percentages because the usage of each new cell pool size is not known. If there are less than 6 pool sizes calculated then the last pool will be set at 2048, as a suggestion.

The invention is preferably implemented as software, that is to say, a machine-readable program storage device (e.g., a disk or tape) tangibly embodying a program of instructions executable by the machine to perform method steps. While a particular embodiment has been shown and described, it will be apparent to those skilled in the art that various modifications and extensions may be made without departing from the principles of the invention.

What is claimed is:

1. In an information handling system having a predetermined routine for obtaining storage from a repository, said predetermined routine requiring a lock for serialization, a method for obtaining storage for a requester while minimizing use of said predetermined routine, comprising the steps of:

maintaining a set of previously assigned storage blocks that have been released by requesters;

maintaining a set of unassigned storage blocks that have been obtained from said repository using said predetermined routine but have not been assigned to a requester;

completing an incoming storage request from said previously assigned storage blocks without acquiring a lock for serialization if said storage request can be completed from said previously assigned storage blocks;

completing said storage request from said unassigned storage blocks without acquiring a lock for serialization if said storage request cannot be completed from said previously assigned storage blocks but can be completed from said unassigned storage blocks; and completing said request from said repository using said predetermined routine if said storage request cannot be completed from either said previously assigned storage blocks or said unassigned storage blocks.

2. The method of claim 1 wherein said first maintaining step comprises the step of:

maintaining a plurality of sets of previously assigned storage blocks, the storage blocks in each of said sets having a predetermined size.

3. The method of claim 1 wherein said second maintaining step comprises the step of:

maintaining a plurality of sets of unassigned storage blocks, the storage blocks in each of said sets having a predetermined size.

4. The method of claim 1 wherein said step of completing an incoming storage request from said previously assigned storage blocks is performed using an atomic operation.

5. The method of claim 1 wherein said step of completing an incoming storage request from said unassigned storage blocks is performed using an atomic operation.

6. The method of claim 1 in which said set of previously assigned storage blocks is initially empty.

7. The method of claim 1 in which said set of unassigned storage blocks is initially empty.

8. The method of claim 1 in which said previously assigned storage blocks are maintained as a linked list.

9. The method of claim 1 in which said previously assigned storage blocks are maintained as a LIFO data structure.

10. The method of claim 1, further comprising the steps of:

maintaining counts of the number of blocks requested for each of a plurality of storage sizes; and determining one or more optimum block sizes based upon said counts.

11. The method of claim 1 wherein said step of completing an incoming storage request from said previously assigned storage blocks is performed using an atomic instruction in which a first value is compared with a second value to produce a comparison result and, depending on the comparison result, replaced with a third value.

12. The method of claim 1 wherein said step of completing said storage request from said unassigned storage blocks is performed using an atomic instruction in which a first value is compared with a second value to produce a comparison result and, depending on the comparison result, replaced with a third value.

13. In an information handling system having a predetermined routine for obtaining storage from a repository, said predetermined routine requiring a lock for serialization, apparatus for obtaining storage for a requester while minimizing use of said predetermined routine, comprising:

means for maintaining a set of previously assigned storage blocks that have been released by requesters;

means for maintaining a set of unassigned storage blocks that have been obtained from said repository using said predetermined routine but have not been assigned to a requester;

means for completing an incoming storage request from said previously assigned storage blocks without acquiring a lock for serialization if said storage request can be completed from said previously assigned storage blocks;

means for completing said storage request from said unassigned storage blocks without acquiring a lock for serialization if said storage request cannot be completed from said previously assigned storage blocks but can be completed from said unassigned storage blocks; and means for completing said request from said repository using said predetermined routine if said storage request cannot be completed from either said previously assigned storage blocks or said unassigned storage blocks.

14. The apparatus of claim 13 wherein said first maintaining means comprises:

means for maintaining a plurality of sets of previously assigned storage blocks, the storage blocks in each of said sets having a predetermined size.

15. The apparatus of claim 13 wherein said second maintaining means comprises:

means for maintaining a plurality of sets of unassigned storage blocks, the storage blocks in each of said sets having a predetermined size.

16. The apparatus of claim 13, further comprising:

means for maintaining counts of the number of blocks requested for each of a plurality of storage sizes; and means for determining one or more optimum block sizes based upon said counts.

17. The apparatus of claim 13 wherein said means for completing an incoming storage request from said previously assigned storage blocks uses an atomic instruction in which a first value is compared with a second value to produce a comparison result and, depending on the comparison result, replaced with a third value.

18. The apparatus of claim 13 wherein said means for completing said storage request from said unassigned storage blocks uses an atomic instruction in which a first value is compared with a second value to produce a comparison result and, depending on the comparison result, replaced with a third value.

19. A program storage device readable by a machine, tangibly embodying a program of instructions executable by the machine to perform method steps for obtaining storage for a requester while minimizing use of a predetermined routine for obtaining storage from a repository in an information handling system having said routine, said predetermined routine requiring a lock for serialization said method steps comprising:

maintaining a set of previously assigned storage blocks that have been released by requesters;

maintaining a set of unassigned storage blocks that have been obtained from said repository using said predetermined routine but have not been assigned to a requester;

completing an incoming storage request from said previously assigned storage blocks without acquiring a lock for serialization if said storage request can be completed from said previously assigned storage blocks;

completing said storage request from said unassigned storage blocks without acquiring a lock for serialization if said storage request cannot be completed from said previously assigned storage blocks but can be completed from said unassigned storage blocks; and completing said request from said repository using said predetermined routine if said storage request cannot be completed from either said previously assigned storage blocks or said unassigned storage blocks.

20. The program storage device of claim 19 wherein said first maintaining step comprises the step of:

maintaining a plurality of sets of previously assigned storage blocks, the storage blocks in each of said sets having a predetermined size.

21. The program storage device of claim 19 wherein said second maintaining step comprises the step of:

maintaining a plurality of sets of unassigned storage blocks, the storage blocks in each of said sets having a predetermined size.

22. The program storage device of claim 19 wherein said step of completing an incoming storage request from said previously assigned storage blocks is performed using an atomic operation.

23. The program storage device of claim 19 wherein said step of completing an incoming storage request from said unassigned storage blocks is performed using an atomic operation.

24. The program storage device of claim 19 in which said set of previously assigned storage blocks is initially empty.

25. The program storage device of claim 19 in which said set of unassigned storage blocks is initially empty.

26. The program storage device of claim 19 in which said previously assigned storage blocks are maintained as a linked list.

27. The program storage device of claim 19 in which said previously assigned storage blocks are maintained as a LIFO data structure.

28. The program storage device of claim 19, said method steps further comprising:

maintaining counts of the number of blocks requested for each of a plurality of storage sizes; and determining one or more optimum block sizes based upon said counts.

29. The program storage device of claim 19 wherein said step of completing an incoming storage request from said previously assigned storage blocks is performed using an atomic instruction in which a first value is compared with a second value to produce a comparison result and, depending on the comparison result, replaced with a third value.

30. The program storage device of claim 19 wherein said step of completing said storage request from said unassigned storage blocks is performed using an atomic instruction in which a first value is compared with a second value to produce a comparison result and, depending on the comparison result, replaced with a third value.

* * * * *

UNITED STATES PATENT AND TRADEMARK OFFICE
CERTIFICATE OF CORRECTION

PATENT NO.     : 6,065,019
DATED          : May 16, 2000
INVENTOR(S)    : Ault et al.

It is certified that error appears in the above-identified patent and that said Letters Patent is hereby corrected as shown below:

Column 12,
Line 51, before the claims, insert -- Appendix A and Appendix B of the application, pages 22 through 26 which were ommited from the Patent -- copies attached hereto.

Signed and Sealed this

Twenty-eighth Day of August, 2001

Attest:

*Nicholas P. Godici*

NICHOLAS P. GODICI
*Attesting Officer*       *Acting Director of the United States Patent and Trademark Office*